United States Patent [19]

Sekiguchi

[11] Patent Number: 5,111,281
[45] Date of Patent: May 5, 1992

[54] COLOR CORRECTION DEVICE FOR AN ENDOSCOPE

[75] Inventor: Tadashi Sekiguchi, Tochigi, Japan

[73] Assignee: Kabushiki Kaisha Toshiba, Kawasaki, Japan

[21] Appl. No.: 593,323

[22] Filed: Oct. 3, 1990

Related U.S. Application Data

[63] Continuation of Ser. No. 462,326, Dec. 28, 1989, abandoned, which is a continuation of Ser. No. 248,121, Sep. 23, 1989, abandoned.

[30] Foreign Application Priority Data

Sep. 28, 1987 [JP] Japan .................... 62-240907

[51] Int. Cl.⁵ ............................... H04N 9/73
[52] U.S. Cl. ........................... 358/29; 358/28; 358/80; 358/98
[58] Field of Search ............. 358/21 R, 27, 29, 29 C, 358/28, 10, 80, 98; 128/6

[56] References Cited

U.S. PATENT DOCUMENTS

| | | | |
|---|---|---|---|
| 4,602,277 | 7/1986 | Guichard | 358/29 C |
| 4,633,304 | 12/1986 | Nagasaki | 358/98 |
| 4,679,066 | 7/1987 | Masunaga | 358/29 C |
| 4,694,329 | 9/1987 | Belmares-Sarabia | 358/29 |
| 4,716,457 | 12/1987 | Matsuo | 358/98 |
| 4,782,384 | 11/1988 | Tucker | 358/80 |
| 4,789,892 | 12/1988 | Tsuzuki | 358/80 |
| 4,805,016 | 2/1989 | Kato | 358/98 |
| 4,812,902 | 3/1989 | Fuchsberger | 358/80 |
| 4,819,077 | 4/1989 | Kikuchi | 358/80 |
| 4,825,297 | 4/1989 | Fuchsberger | 358/80 |

Primary Examiner—Tommy P. Chin
Attorney, Agent, or Firm—Foley & Lardner

[57] ABSTRACT

A color correction device for an endoscope capable of performing color corrections in accordance with chromatic characteristics such as saturation and/or hue of image signals is disclosed. The device includes an unit that selects appropriate color corrections to be made in accordance with chromatic characteristics of image signals, and an unit that performs the selected color corrections. An endoscope incorporating such a device is also disclosed.

15 Claims, 7 Drawing Sheets

COLOR CORRECTION DEVICE FOR AN ENDOSCOPE

This application is a continuation of application Ser. No. 07/462,326, filed Dec. 28, 1989 which is a continuation of Ser. No. 07/248,121 filed on Sep. 23, 1988, now abandoned.

BACKGROUND OF THE INVENTION

1. Field of the Invention

The present invention relates to an endoscope and, more particularly, to a color correction device for reproducing the desired colors such as natural colors of an imaged object on a display of an endoscope, and an endoscope including the color correction device.

2. Description of the Prior Art

In a clinical diagnosis using an endoscope, the color qualities of displayed images provide important guidance for distinguishing abnormal from normal parts, or for judging the severity of diseases. It is therefore crucially important for an endoscope to display the desired colors, such as the natural colors of an imaged object. In a conventional endoscope, color information is transmitted by image signals representing the tristimulus values such as R, G, B or Y, R-Y, B-Y, where a luminance Y is given, for instance, in the NTSC system by the following formula:

$$Y = 0.30R + 0.59G + 0.11B \quad (1)$$

These signals, however, are influenced by the imaging characteristics of the endoscope such as the optical properties of a scope and the electric properties of a camera unit. For this reason, it is necessary in such a conventional endoscope to perform color corrections in order to reproduce the desired colors such as natural colors of the imaged object.

Such color corrections have been performed in the conventional endoscope by operations of the color correction factors on the image signals, as represented by the following formula:

$$\begin{bmatrix} Y \\ R-Y \\ B-Y \end{bmatrix}_{out} = \begin{bmatrix} a_{11} & a_{12} & a_{13} \\ a_{21} & a_{22} & a_{23} \\ a_{31} & a_{32} & a_{33} \end{bmatrix} \begin{bmatrix} Y \\ R-Y \\ B-Y \end{bmatrix}_{in} \quad (2)$$

or, $$\begin{bmatrix} R \\ G \\ B \end{bmatrix}_{out} = \begin{bmatrix} b_{11} & b_{12} & b_{13} \\ b_{21} & b_{22} & b_{23} \\ b_{31} & b_{32} & b_{33} \end{bmatrix} \begin{bmatrix} R \\ G \\ B \end{bmatrix}_{in} \quad (3)$$

depending on the tristimulus values used. These color corrections have been performed conventionally under the white-balance condition, i.e., the adjustment with respect to the point representing white on the chromaticity diagram.

However, it is difficult to achieve satisfactory color reproductions by such prior art methods, because in these methods a fixed set of color correction factors is used to correct all colors regardless of their saturations or hues.

SUMMARY OF THE INVENTION

It is therefore an object of the present invention to provide a color correction device for endoscope capable of performing color corrections in accordance with saturations and/or hues of image signals.

Another object of the present invention is to provide an endoscope capable of color corrections in accordance with saturations and/or hues of image signals, so that satisfactory reproductions of color qualities of an imaged object on displays can be obtained.

According to one aspect of the present invention, there is provided a color correction device for an endoscope, comprising means for specifying an appropriate color correction to be made in accordance with a certain chromatic characteristic of image signals; and means for performing the color correction specified by the specifying means.

According to another aspect of the present invention, there is provided an endoscope, comprising a scope including imaging device means for capturing light signals from an object to be imaged; camera control unit means for extracting image signals from output signals of the imaging device means; and color correction device including means for specifying an appropriate color correction to be made in accordance with a certain chromatic characteristic of image signals, and means for performing the color correction specified by the specifying means.

The other features and advantages of the present invention will become apparent from the following description taken in conjunction with the accompanying drawings.

DETAILED DESCRIPTION OF THE PREFERRED EMBODIMENTS

Figure 1:
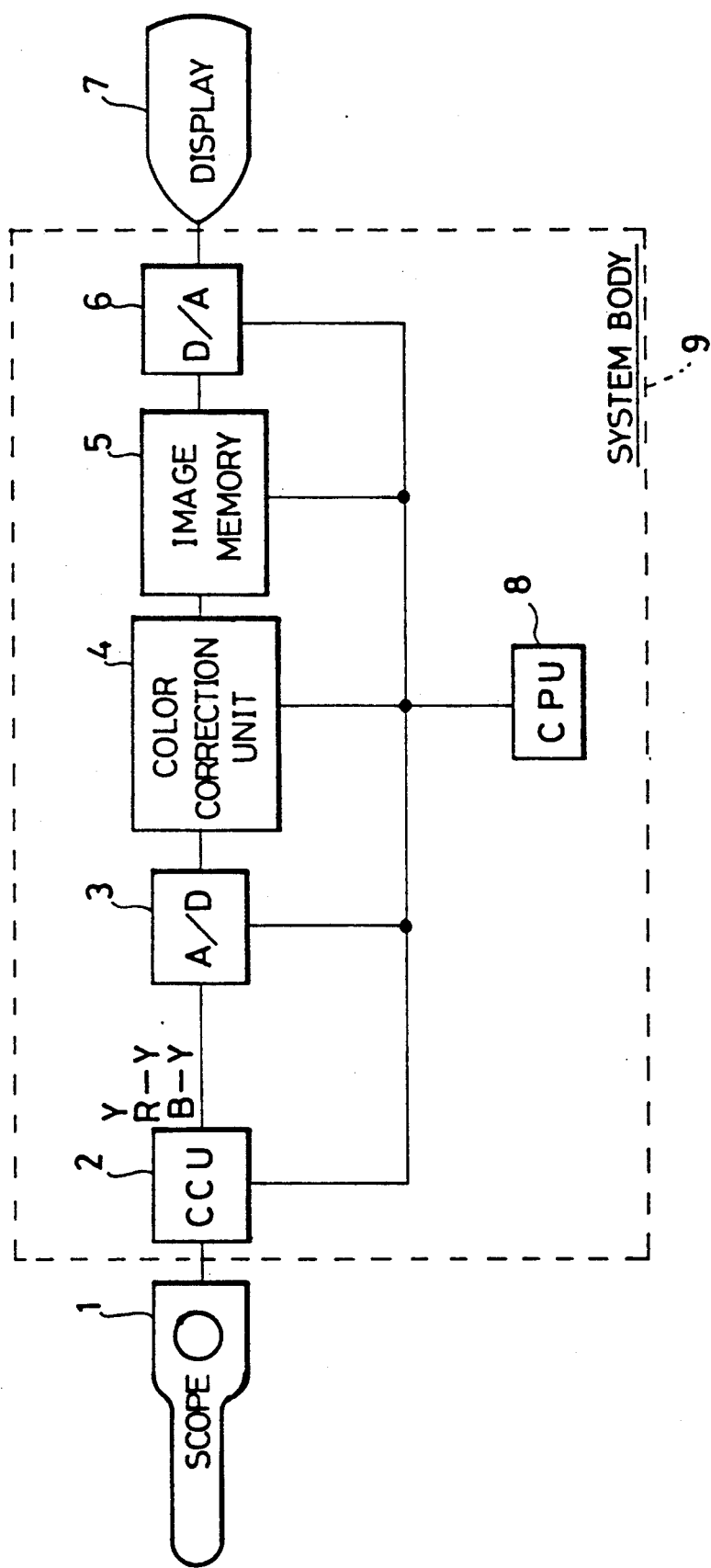
FIG. 1 is a schematic block diagram of one embodiment of an endoscope according to the present invention.

Referring now to FIG. 1, there is shown one embodiment of an endoscope according to the present invention. This endoscope is designed for the case where the tristimulus values consist of a luminance Y, and color differences R-Y and B-Y, and where the color corrections are performed in accordance with the saturations of image signals.

This endoscope is comprised of a scope 1 including an imaging device (not shown) such as a charge coupled device (CCD) for taking images of objects, and a system body 9 including a camera control unit (CCU) 2 for extracting image signals from output signals of the imaging device for storing image signals, an A/D converter 3, a color correction unit 4 to be explained below, an image memory 5, a D/A converter 6, a display 7 for displaying images of the objects, and a central processing unit (CPU) 8 for controlling operations of components of the system body 9.

Figure 2:
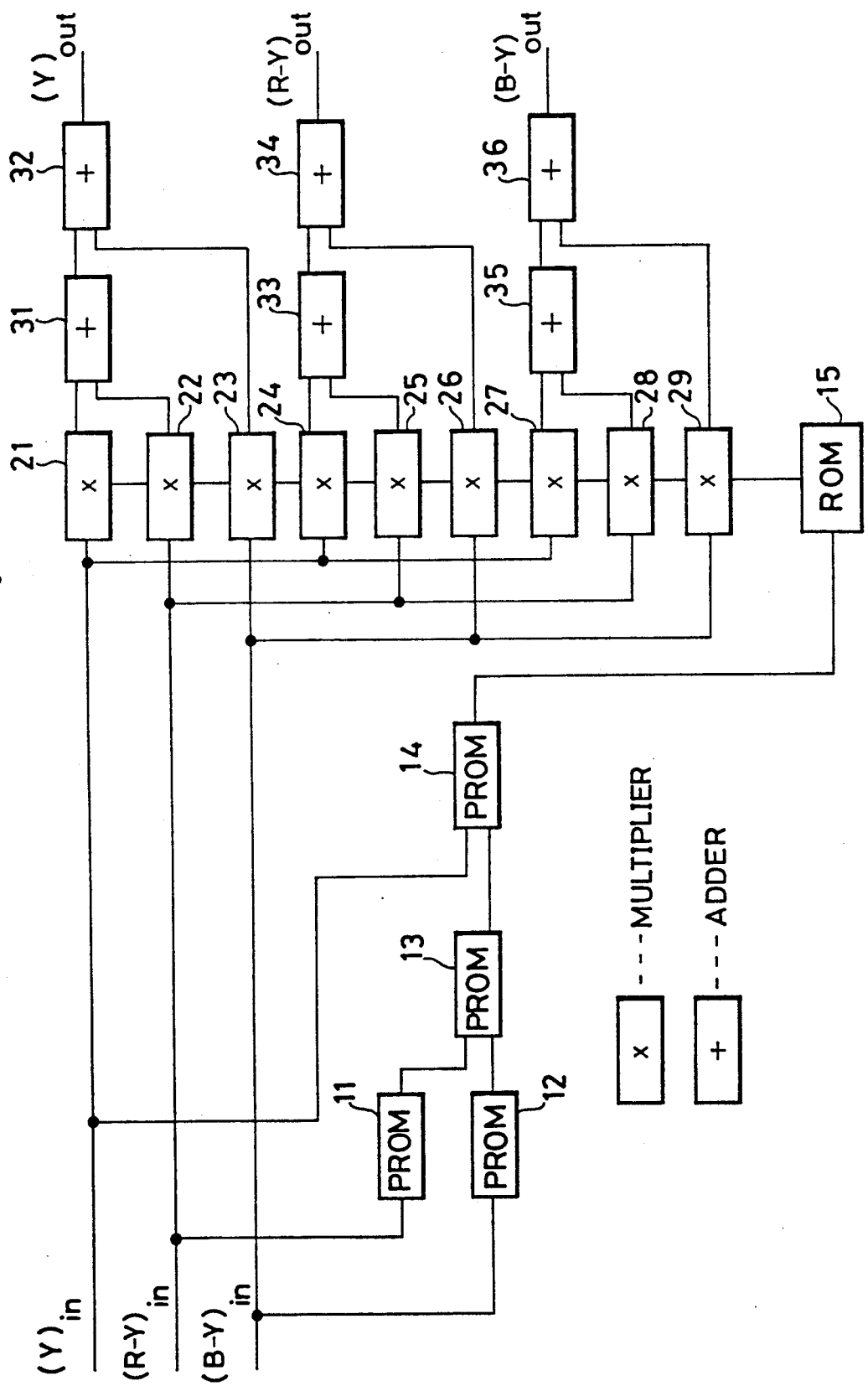
FIG. 2 is a block diagram of a color correction unit of the endoscope shown in FIG. 1.

FIG. 2 shows a block diagram of the color correction unit 4 in this endoscope, comprising multipliers 21-29 and adders 31-36 for executing calculations required for the color corrections, programmable read only memories (PROMs) 11-14 for selecting appropriate addresses corresponding to the saturations of the image signals, and a read only memory (ROM) 15 which memorizes color correction factors predetermined according to the optical and the electric properties of the endoscope and which provides the color correction factors stored in the addresses selected by the PROMs 11-14 to the multiplies 21-29.

Next the operation of this embodiment will be explained referring to FIGS. 1 and 2. Light signals entering the scope 1 are converted into electric signals by the CCD not shown. Out of these electric signals, image signals Y, R-Y, and B-Y are extracted by the CCU 2. The extracted image signals are digitized by the A/D converter 3, and then the color corrections in accordance with the saturations of these image signals are performed on these digital image signals by the color correction unit 4. This will be explained in detail below. The color corrected signals are subsequently recorded in the image memory 5, and then converted back to analog signals by the D/A converter 6. The images of the object will be displayed on the display 7. These processes are controlled by the CPU 8.

The color corrections by the color correction unit 4 mentioned above are carried out as follows. The PROM 11 which takes in $(R-Y)_{in}$ signal selects the address of the size $(R-Y)_{in}^2$, while the PROM 12 which takes in $(B-Y)_{in}^2$. These signal selects the address of the size $(B-Y)_{in}^2$. These selected addresses are given to the PROM 13, which in turn selects the address of the size given by:

$$(R - Y)_{in}^2 + \frac{(B - Y)_{in}^2}{(1.78)^2} \tag{4}$$

The PROM 14 takes in this address selected by the PROM 13 and $(Y)_{in}$ signal, and selects the address of the size given by:

$$\left[(R - Y)_{in}^2 + \frac{(B - Y)_{in}^2}{(1.78)^2}\right] \cdot \frac{1}{(1.14)^2} \cdot \frac{1}{(Y)_{in}^2} \tag{5}$$

This corresponds to the saturation of the color image signals.

The ROM 15 provides a set of the color correction factors stored in the address corresponding to the one selected by the PROM 14 to the multipliers 21-29. The calculations according to the aforementioned equation (2) with the color correction factors provided by the ROM 15 are then carried out by the multipliers 21-29 and the adders 31-36, to yield the color corrected signals $(Y)_{out}$, $(R-Y)_{out}$, and $(B-Y)_{out}$.

To be more specific, the $(Y)_{in}$ signal is multiplied by the factors $a_{11}$, $a_{21}$, $a_{31}$ at the multipliers 21, 24, 27, respectively. The $(R-Y)_{in}$ signal is multiplied by the factors $a_{12}$, $a_{22}$, $a_{32}$ at the multipliers 22, 25, 28, respectively. The $(B-Y)_{in}$ signal is multiplied by the factors $a_{13}$, $a_{23}$, $a_{33}$ at the multipliers 23, 26, 29, respectively. The adder 31 adds $(Y)_{in}(a_{11})$ from the multiplier 21 and $(R-Y)_{in}(a_{12})$ from the multiplier 22, the adder 33 adds $(Y)_{in}(a_{21})$ from the multiplier 24 and $(R-Y)_{in}(a_{22})$ from the multiplier 25, and the adder 35 adds $(Y)_{in}(a_{31})$ from the multiplier 27 and $(B-Y)_{in}(a_{33})$ from the multiplier 28. Then, the adder 32 adds $(Y)_{in}(a_{11})+(R-Y)_{in}(a_{12})$ from the adder 31 and $(B-Y)_{in}(a_{13})$ from the multiplier 23, the adder 34 adds $(R-Y)_{in}(a_{21})+(R-Y)_{in}(a_{22})$ from the adder 33 and $(B-Y)_{in}(a_{23})$ from the multiplier 26, and the adder 36 adds $(Y)_{in}(a_{31})+(R-Y)_{in}(a_{32})$ from the adder 35 and $(B-Y)_{in}(a_{33})$ from the multiplier 29. The results of the adder 32, 34, 36 are $(Y)_{out}$, $(R-Y)_{out}$, and $(B-Y)_{out}$, respectively. In short, the calculations according to the following equation:

$$\begin{bmatrix} Y \\ R - Y \\ B - Y \end{bmatrix}_{out} = \begin{bmatrix} a_{11} & a_{12} & a_{13} \\ a_{21} & a_{22} & a_{23} \\ a_{31} & a_{32} & a_{33} \end{bmatrix} \begin{bmatrix} Y \\ R - Y \\ B - Y \end{bmatrix}_{in} \tag{6}$$

$$= \begin{bmatrix} a_{11}(Y)_{in} + a_{12}(R - Y)_{in} + a_{13}(B - Y)_{in} \\ a_{21}(Y)_{in} + a_{22}(R - Y)_{in} + a_{23}(B - Y)_{in} \\ a_{31}(Y)_{in} + a_{32}(R - Y)_{in} + a_{33}(B - Y)_{in} \end{bmatrix}$$

have been carried out by the multipliers 21-29 and the adders 31-36. This completes the color corrections.

Since the color correction factors memorized in the ROM 15 are predetermined to suit the optical and electric characteristics of the endoscope, and the color correction factors actually used are selected in accordance with the saturation of the image signals, this endoscope is capable of reproducing natural color qualities of the imaged object.

Another embodiment of the present invention corresponds to the case where the tristimulus values consist of R, G, and B, and where the color corrections are performed in accordance with the saturations of the image signals. This embodiment is now explained referring to FIG. 3. Here, the explanation of those parts that appeared in the previous embodiment will be omitted.

Figure 3:
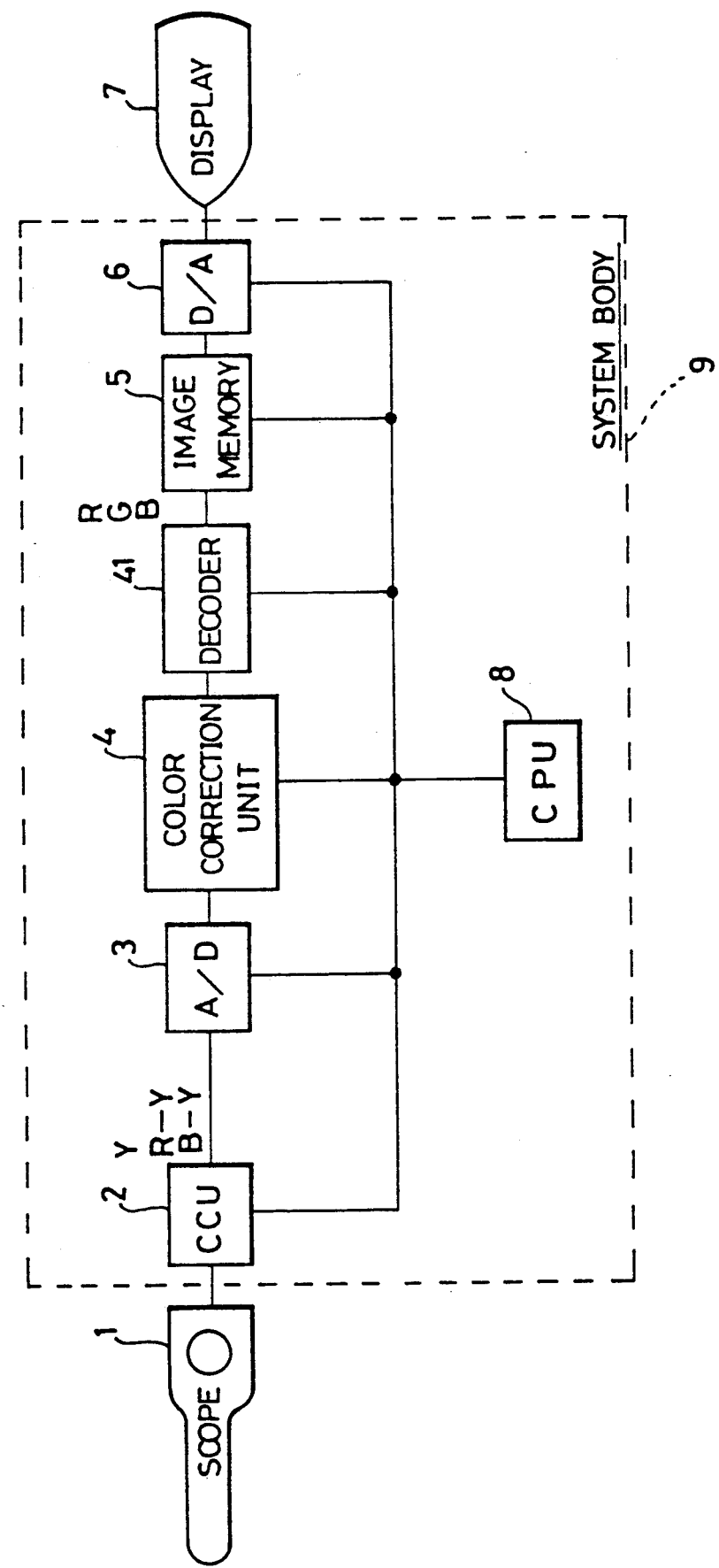
FIG. 3 is a schematic block diagram of another embodiment of an endoscope according to the present invention.

FIG. 3 shows the second embodiment of an endoscope according to the present invention. This endoscope includes, in addition to those parts that appeared in the previous embodiment, a decoder 41 located between the color correction unit 4 and the image memory 5 for converting the color corrected image signals Y, R-Y, and B-Y into R, G, B signals. The operation of this endoscope is identical to that of the previous embodiment except that the decoder 41 converts Y, R-Y, and B-Y signals from the color correction unit 4 into R, G, B signals. As a result, the images are now stored in the image memory 5 in terms of these R, G, B signals which may be more suitable for further elaborations required as parts of image processing.

Figure 4:
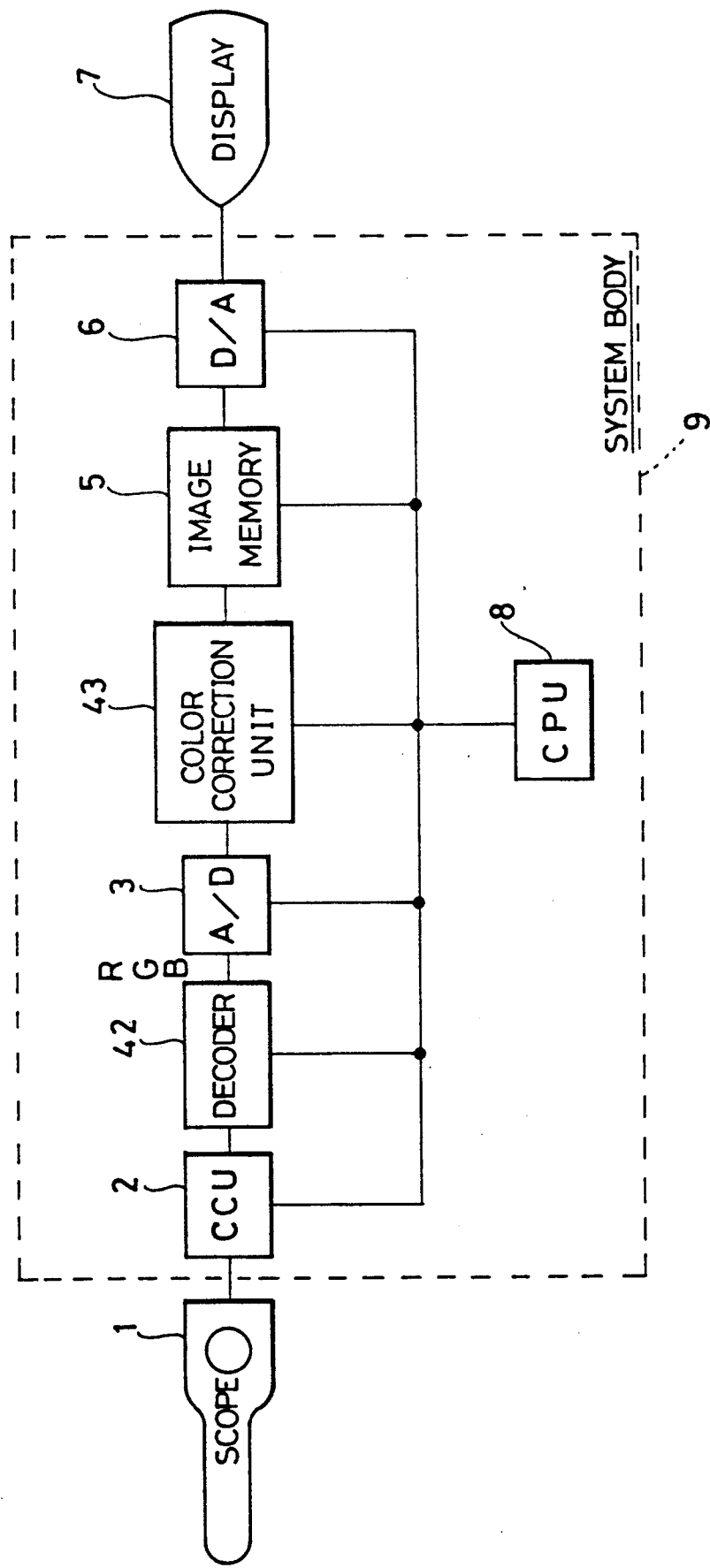
FIG. 4 is a schematic block diagram of yet another embodiment of an endoscope according to the present invention.
Figure 5:
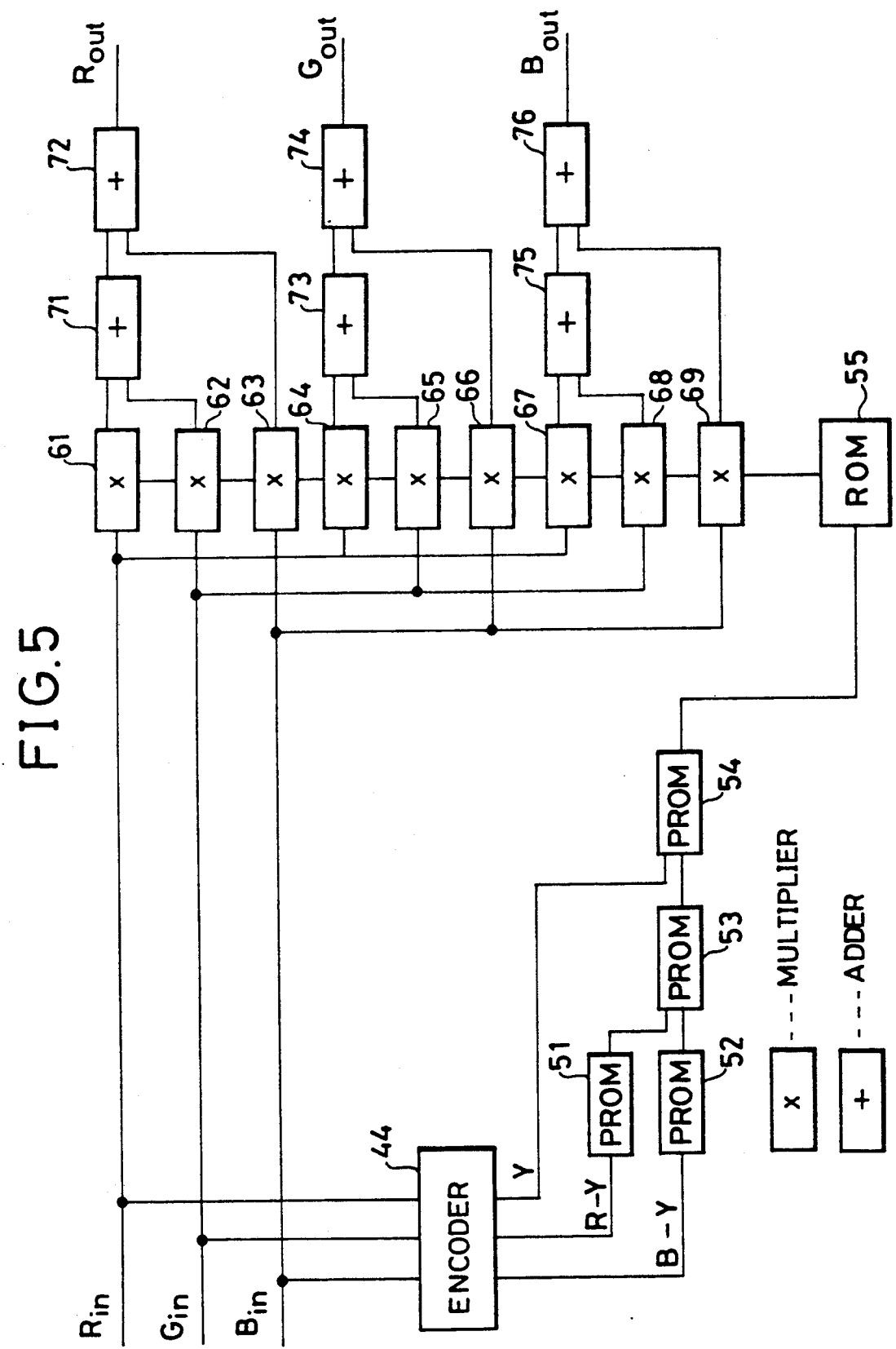
FIG. 5 is a block diagram of a color correction unit of the endoscope shown in FIG. 4.

The same effect can be achieved also by an endoscope according to the another embodiment of the present invention shown in FIGS. 4 and 5. Here again, the explanation of those parts that appeared in the previous embodiments will be omitted.

FIG. 4 shows the third embodiment of an endoscope according to the present invention. This endoscope includes, in addition to those parts that appeared in the first embodiment, a decoder 42 for converting image signals Y, R-Y, and B-Y from the CCU 2 to R, G, B signals, and the color correction unit 43 which performs color corrections on R, G, B signals in accordance with the saturation of these image signals. FIG. 5 shows a block diagram of this color correction unit 43 which includes, in addition to the equivalents of those parts that appeared in the first embodiment, an encoder 44 for converting R, G, B signals to Y, R-Y, B-Y signals.

In this embodiment, the CCU 2 extracts Y, R-Y, B-Y signals as in the previous embodiments. These signals are then converted to R, G, B signals by the decoder 42. R, G, B signals are then digitized by the A/D converter 3, and the color corrections are performed on these digitized R, G, B signals by the color correction unit 43 in accordance with the saturation of these signals. This will be, explained in more detail below. After the color corrections are made by the color correction unit 43, operation of this embodiment is identical to those of the first embodiment.

The color corrections by the color correction unit 43 mentioned above are carried out as follows. The digitized R, G, B signals are fed to the multipliers 61–69 as well as to the encoder 44. The encoder 44 converts R, G, B signals to Y, R-Y, B-Y signals, and feed these converted signals to the PROMs 51–54. The operations of the PROMs 51–54 are identical to those of the first embodiment. The ROM 55 in this color correction unit memorizes the color correction factors predetermined according to the optical and the electric properties of the endoscope and appropriate for R, G, B signals. The rest of the operations of this color correction unit is identical to that of the first embodiment. It is obvious that this embodiment is capable, similarly to the previous embodiments, of reproducing natural color qualities of the imaged object.

In these three embodiments of the present invention, the color correction factors are specified by selecting the appropriate addresses in the ROM 15 or 55 where the appropriate color correction factors are stored. Consequently, it is necessary to divide up the entire range of the saturation into smaller parts and to assign the appropriate color correction factors to these parts, which are to be stored in the different addresses of the ROM 15 or 55. This means the appropriate color correction factors are provided for a number of discrete intervals of the entire range of the saturation, but within each interval no distinction is made between different saturations.

Figure 6:
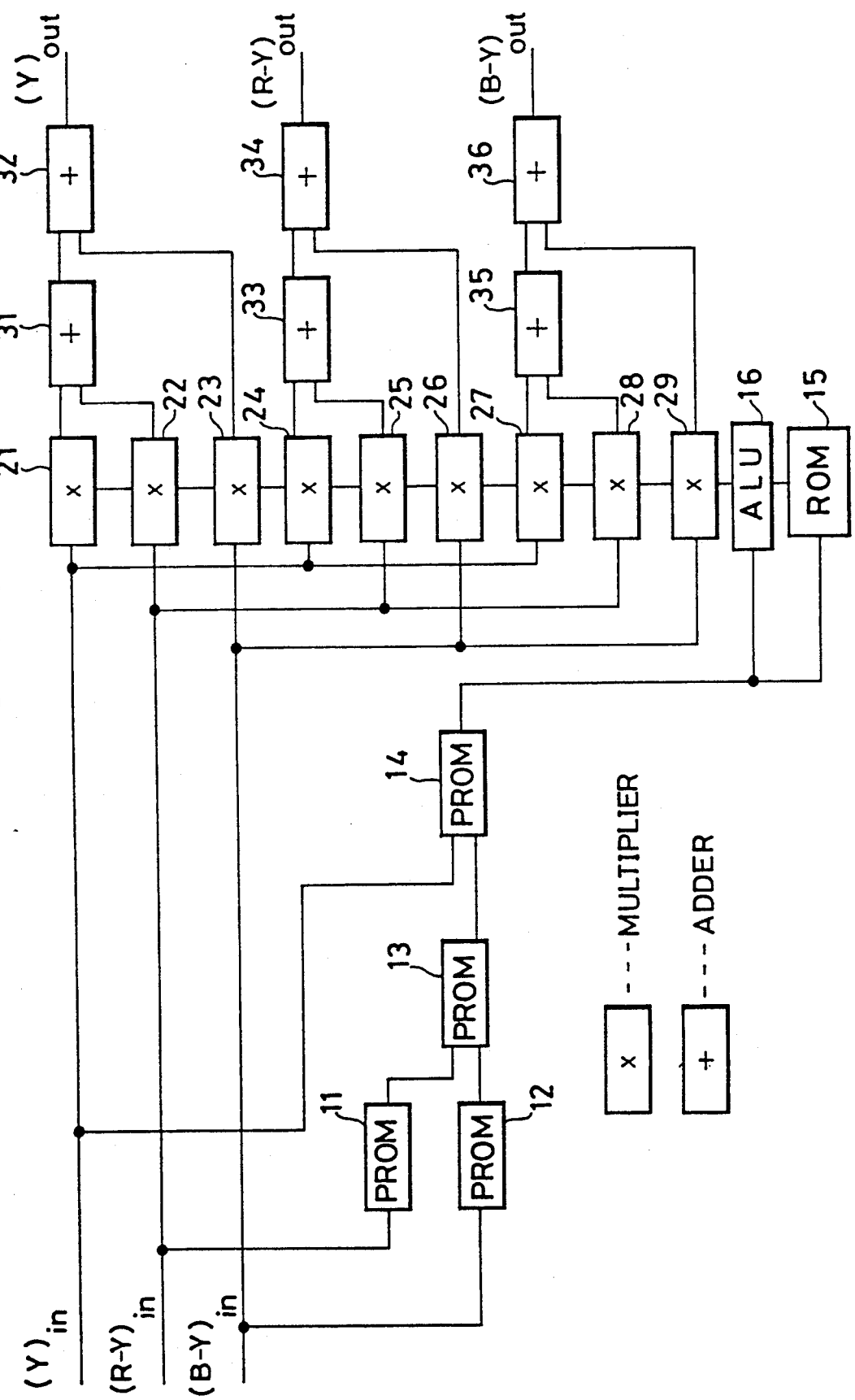
FIG. 6 is a block diagram of a color correction unit of an endoscope according to the present invention, which is capable of performing the color correction with continuous color correction factors.

This situation can be ameliorated by the substitution of a color correction unit shown in FIG. 6 in the place of the color correction unit 4 in FIG. 1. This color correction unit differs from the one shown in FIG. 2 by incorporating an arithmetic logic unit (ALU) 16 located between the ROM 15 and the multipliers 21–29. The rest of this color correction unit is identical to that shown in FIG. 2. This ALU calculates continuously variable color correction factors from sets of discrete color correction factors stored in the ROM 15 so that accurately proper color correction factors can be provided for any value of the saturation. Obviously, the same effect can be achieved in the second or the third embodiment described above by incorporating the ALU 16 in the color correction unit in the manner similar to one just described for the first embodiment.

Figure 7:
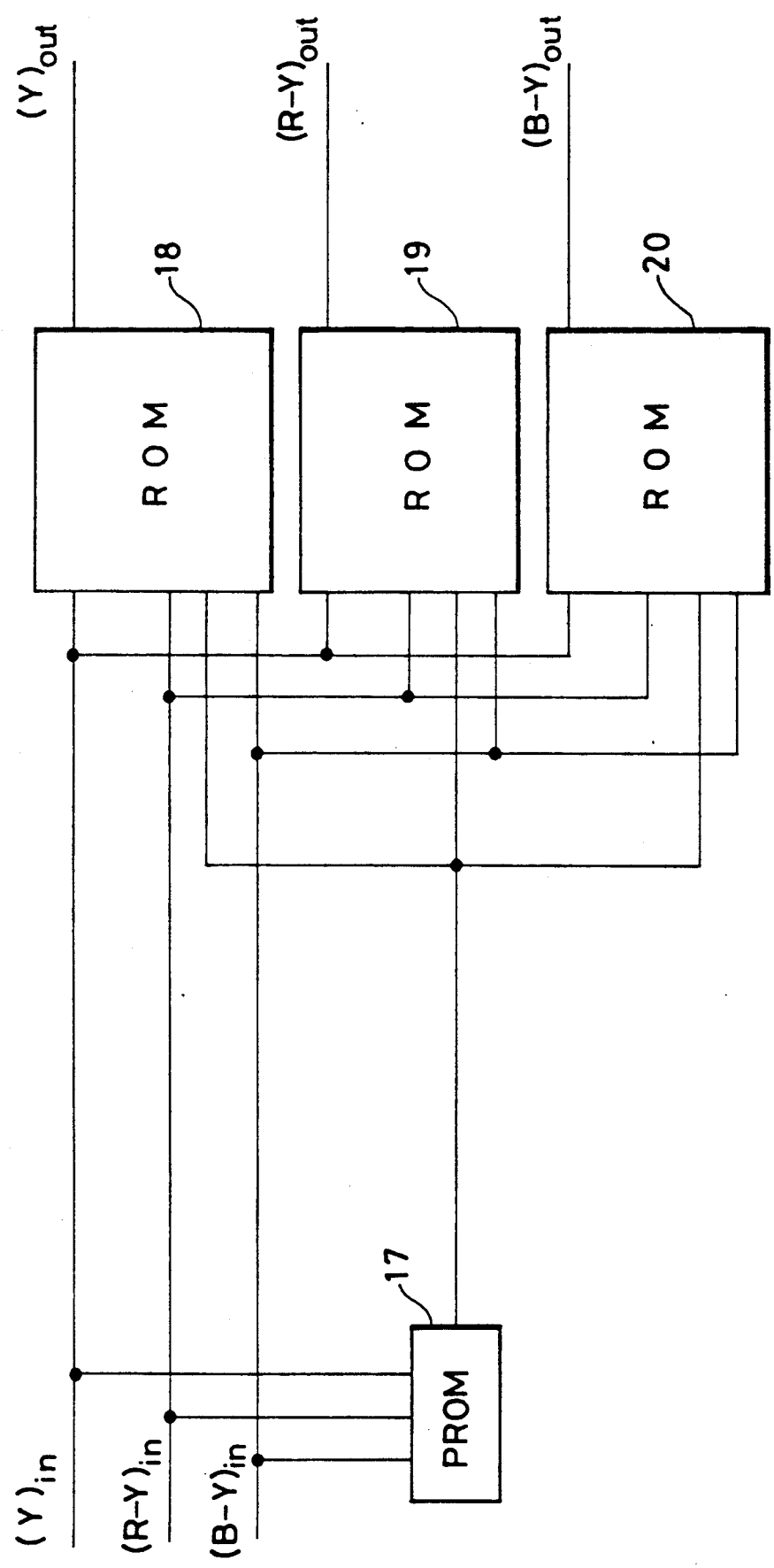
FIG. 7 is a block diagram of a color correction unit of an endoscope according to the present invention, which is capable of performing the color correction with an improved rapidity.

Meanwhile, a different kind of improvement can be achieved by the substitution of a color correction unit shown in FIG. 7 in the place of the color correction unit 4 in FIG. 1. This color correction unit is comprised of a PROM 17 and three ROMs 18, 19 and 20. The PROM 17 replaces the PROMs 11–14 of the color correction unit of FIG. 2 and performs a similar function of selecting appropriate addresses of the ROMs 18, 19, and 20 in accordance with the saturation of the image signals. The ROMs 18, 19, and 20 replace the ROM 15, the multipliers 21–29, and adders 31–36 of the color correction unit of FIG. 2 by memorizing not just color correction factors but formulae for calculations of color corrections. Namely, the ROM 18 memorizes $$(a_{11})(Y)_{in} + (a_{12})(R-Y)_{in} + (a_{31})(B-Y)_{in}$$

the ROM 19 memorizes
$$(a_{21})(Y)_{in} + (a_{22})(R-Y)_{in} + (a_{23})(B-Y)_{in}$$

and the ROM 20 memorizes
$$(a_{31})(Y)_{in} + (a_{32})(R-Y)_{in} + (a_{33})(B-Y)_{in}$$

for all available sets of the color correction factors $\{a_{11}, a_{12}, a_{13}, a_{21}, a_{22}, a_{23}, a_{31}, a_{32}, a_{33}\}$. As a result, the process of the color correction can be performed faster with this color correction unit, although it requires ROMs of much larger memory capacity. Obviously, R, G, B signals can be treated in the manner similar to one just described for Y, R-Y, B-Y signals.

It can be appreciated now that the endoscope according to the present invention can perform the color corrections in accordance with the saturation of the image signals, so that it is possible to reproduce the desired colors such as natural colors of the imaged objects on the display. Moreover, since the color correction factors for each value of saturation are determined in accordance with the optical and the electric properties of the endoscope, the deviations of color qualities on the display due to such structural characteristics of the endoscope can be eliminated.

Furthermore, although all the embodiments have been described for the case where the color corrections are performed in accordance with the saturation of the image signals, those skilled in the art can easily realize that it is also possible to design a color correction unit of the present invention such that the color corrections are performed in accordance with the hue of the image signals, or with both the saturation and the hue of the image signals.

Besides these, many modifications and variations of these embodiments can be made without departing from the novel and advantageous features of this invention. Accordingly, all such modifications and variations are intended to be included within the scope of the appended claims.

What is claimed is:

1. A color correction device for an endoscope, comprising:
    means for specifying an appropriate color correction for image signals to be made in accordance with certain chromatic characteristics of said image signals; and
    means for performing the color correction specified by the specifying means, including:
        calculation means receiving said image signals for carrying out calculations for the color correction; and
        memory means for storing sets of color correction factors to be used in the calculation of the color correction and for providing an appropriate set of the color correction factors to the calculation means, the appropriate set of the color correction factors being selected according to addresses of the memory means specified by the specifying means according to said certain chromatic characteristics of said image signals.

2. The device of claim 1, wherein the performing means includes memory means which store formulae for calculations of the color correction, and wherein the specifying means selects addresses of the memory means corresponding to the appropriate color correction formulae.

3. The device of claim 1, wherein the chromatic characteristics include saturation.

4. The device of claim 1, wherein the chromatic characteristics include hue.

5. The device of claim 1, wherein the chromatic characteristics include saturation and hue.

6. The device of claim 1, further comprising means for converting the image signals in the form of RGB signals into image signals in the form of NTSC signals.

7. The device of claim 1, wherein the performing means further includes arithmetic logic means which calculates continuously variable color correction factors from at least two sets of the color correction factors stored in the memory means.

8. An endoscope comprising:
a scope including imaging device means for picking up light signals form an object to be imaged;
camera control unit means for extracting image signals from output signals of the imaging device means; and
a color correction device, including means for specifying an appropriate color correction for said image signals to be made in accordance with certain chromatic characteristics of said image signals extracted by the camera control unit means, and means for performing the color correction specified by the specifying means; said performing means further including:
calculation means receiving said image signals for carrying out calculations for the color correction; and
memory means for storing sets of color correction factors to be used in the calculation for the color correction and for providing an appropriate set of the color correction factors to the calculation means, the appropriate set of the color correction factors being selected according to addresses of the memory means specified by the specifying means according to said certain chromatic characteristics of said image signals.

9. The endoscope of claim 8, wherein the performing means includes memory means which store formulae for calculations of the color correction, and wherein the specifying means selects addresses of the memory means corresponding to the appropriate color correction formulae.

10. The endoscope of claim 8, wherein the chromatic characteristics include saturation.

11. The endoscope of claim 8, wherein the chromatic characteristics include hue.

12. The endoscope of claim 8, wherein the chromatic characteristics include saturation and hue.

13. The endoscope of claim 8, further comprising means for converting the image signals in the form of NTSC signals into image signals in form of RGB signals.

14. The endoscope of claim 8, wherein the performing means further includes means for converting the image signals in the form of RGB signals into image signals in the form of NTSC signals.

15. The endoscope of claim 8, wherein the performing means further includes arithmetic logic means which calculates continuously variable color correction factors from a set of the color correction factors stored in the memory means.

* * * * *